United States Patent [19]
McCabe

[11] Patent Number: 5,955,008
[45] Date of Patent: Sep. 21, 1999

[54] PAD SHIELD FOR SINGLE INLET EVAPORATIVE COOLERS

[76] Inventor: Ronald Paul McCabe, 737 E. Tuckey La., Phoenix, Ariz. 85014

[21] Appl. No.: 09/088,335

[22] Filed: Jun. 1, 1998

[51] Int. Cl.⁶ ...................................................... B01F 3/04
[52] U.S. Cl. .................. 261/100; 261/106; 261/DIG. 41; 312/31.04; 312/31.05
[58] Field of Search ..................................... 261/100, 103, 261/105, 106, 107, DIG. 41; 312/31.04, 31.05, 31.06

[56] References Cited

U.S. PATENT DOCUMENTS

| | | | |
|---|---|---|---|
| 3,738,621 | 6/1973 | Anderson | 261/105 |
| 4,672,820 | 6/1987 | Goettl | 261/DIG. 41 |
| 5,211,891 | 5/1993 | Anoszko | 261/106 |
| 5,226,293 | 7/1993 | Brock | 261/106 |
| 5,368,784 | 11/1994 | Annestedt, Sr. | 261/106 |
| 5,374,381 | 12/1994 | Schuld et al. | 261/107 |

OTHER PUBLICATIONS

Essickair brochure May 1998 See Comfort Cool features.
Phoenix Manufacturing brochure Nov. 1997 See features of p. 1 on the Trophy series evaporative cooler.

*Primary Examiner*—C. Scott Bushey

[57] ABSTRACT

A preformed non-ferrous shield which will fit against but stand off of the interior side walls of the wet section of a single inlet evaporative cooler. It has molded in air access channels in one side. These air access channels permit the differential in air pressure between the inside and outside of the cooler cabinet, when the cooler is in operation, to actively draw a flow of dry air into and between the shield and the cooler's wet section interior side walls thereby retarding all forms of corrosion but specifically retarding anaerobic corrosion, oxidation of a ferrous material caused by the absence of free oxygen molecules. The shield is formed of a thin, flexible, impermeable material which forms a barrier that provides for a convenient structure for blocking water from flowing onto the interior side walls of the cooler's wet section during operation and provides for the immediate evaporation of remaining moisture caused by sweating after the cooler is turned off. The shield facilitates cleaning, repair and installation of single inlet pads and greatly reduces the opportunity for corrosion to the cooler.

1 Claim, 4 Drawing Sheets

PAD SHIELD FOR SINGLE INLET EVAPORATIVE COOLERS

CROSS-REFERENCE TO RELATED APPLICATION

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF INVENTION

This invention pertains to single inlet evaporative coolers, particularly to the installation of single inlet cooler pads and maintaining the interior side walls of the wet section of said coolers.

Single inlet evaporative coolers are widely employed to cool buildings in areas of the country where the humidity is sufficiently low. These coolers must be cleaned periodically and the pad must be replaced.

Water held in a sheet metal reservoir of the wet section of such coolers is pumped to the top of a porous single pad through which air is drawn and cooled by evaporation. Water not evaporated drains back to the reservoir. A float-activated valve maintains the water level. Styrofoam spacers are commonly used between the pad and interior side wall contact points as a means to wedge the pad tightly into position. Contaminates that lodge in between said spacers and the interior metal side wall of said wet section at said contact points eventually permeate into the plating or galvanizing of the metal and corrosion results. Numerous other disadvantages exist with this installation protocol.

The major disadvantage with the Styrofoam spacer being wedged tightly against the wet section interior side wall is that water leaches in between said spacer and said side wall and reaches areas where there is no access for free oxygen. Anaerobic corrosion results. This form of corrosion actually accelerates the oxidation rate of the sheet metal side wall.

Heretofore, the interior side walls would be dried, scrapped or brushed, and debris removed. Special attention would be given to badly corroded spots and leaks would be repaired. Once said side wall is properly prepared, it would then be treated to stop the rust and repainted. In extreme cases it may not be possible to repair said leaks. This is a time-consuming, dirty task. Such treatments generally require considerable drying time before the cooler can be re-assembled and placed into service. Two pieces of prior art have been found to be directed to this problem.

ESSICKAIR of Little Rock, Ark. places a non-metallic moisture shield inside the wet section of its single inlet cooler. It is a flat piece of plastic which is positioned between the single inlet pad and the interior side wall of the cooler's wet section. This moisture shield, while removable, is presented as an integral part of the cooler. Its most serious failing is that, as with the Styrofoam spacer, it rests directly on the metal interior side wall of the wet section cabinet and creates the means for moisture from internal sweating to be captured in an area where no free oxygen molecules are present. When the Styrofoam spacers are wedged in with the pad, the moisture shield is pressed even more firmly against the interior side wall removing any possibility for oxygen to enter. Again, anaerobic corrosion is promoted rather than discouraged. This moisture shield fits only the ESSICKAIR single inlet cooler and does not address coolers distributed by other manufacturers.

Phoenix Manufacturing Inc. of Phoenix, Ariz. manufactures a single inlet cooler which claims a plastic liner as an integral feature of its single inlet cooler. Attention has been given in this application not to allow this plastic liner to rest directly against the interior side wall of the wet section. The disadvantage to this design is that provision is made only for casual evaporation of moisture. While some oxygen can reach areas behind this moisture shield, no provision is made to introduce oxygen. The design constricts the flow of free oxygen molecules across the interior side wall of the wet section. As with the art cited above, this feature is presented as part of the cooler and does not apply to other manufacturer's models, including older models of the same manufacturer.

No patents are found to be directed to this issue.

BRIEF SUMMARY OF THE INVENTION

This invention has several advantages over the cited prior art. The principal features that differentiate said invention from all prior art are:

(a) Molded in air access channels;

(b) the utilization of the air pressure differential between the inside and outside of the cooler's cabinet is employed to actively draw air into these channels during operation of said cooler in order to actively introduce a flow of free oxygen molecules between said invention and said cooler's interior metal wet section side walls thereby retarding all forms of corrosion but specifically addressing anaerobic corrosion. Dryness of said interior side walls being the primary objective;

(c) it has preformed features which provide a convenient means to manage immediate evacuation of any moisture introduced onto said interior side walls;

(d) while said invention can be flexed sufficiently to permit easy installation, it is fully preformed and holds a rigid shape;

(e) it is sufficiently durable to withstand multiple season use, yet inexpensive enough to be discarded and replaced annually;

(f) said invention will accommodate most single inlet cooler models, regardless of manufacturer;

(g) depending upon location, leaks in the side walls may not need to be repaired when the invention is used with installation of a new or cleaned pad.

These advantages are in addition to all previous cited art. Further objects and advantages will become apparent from a consideration of the ensuing description and drawings.

REFERENCE NUMERALS IN DRAWINGS

Figure 1:
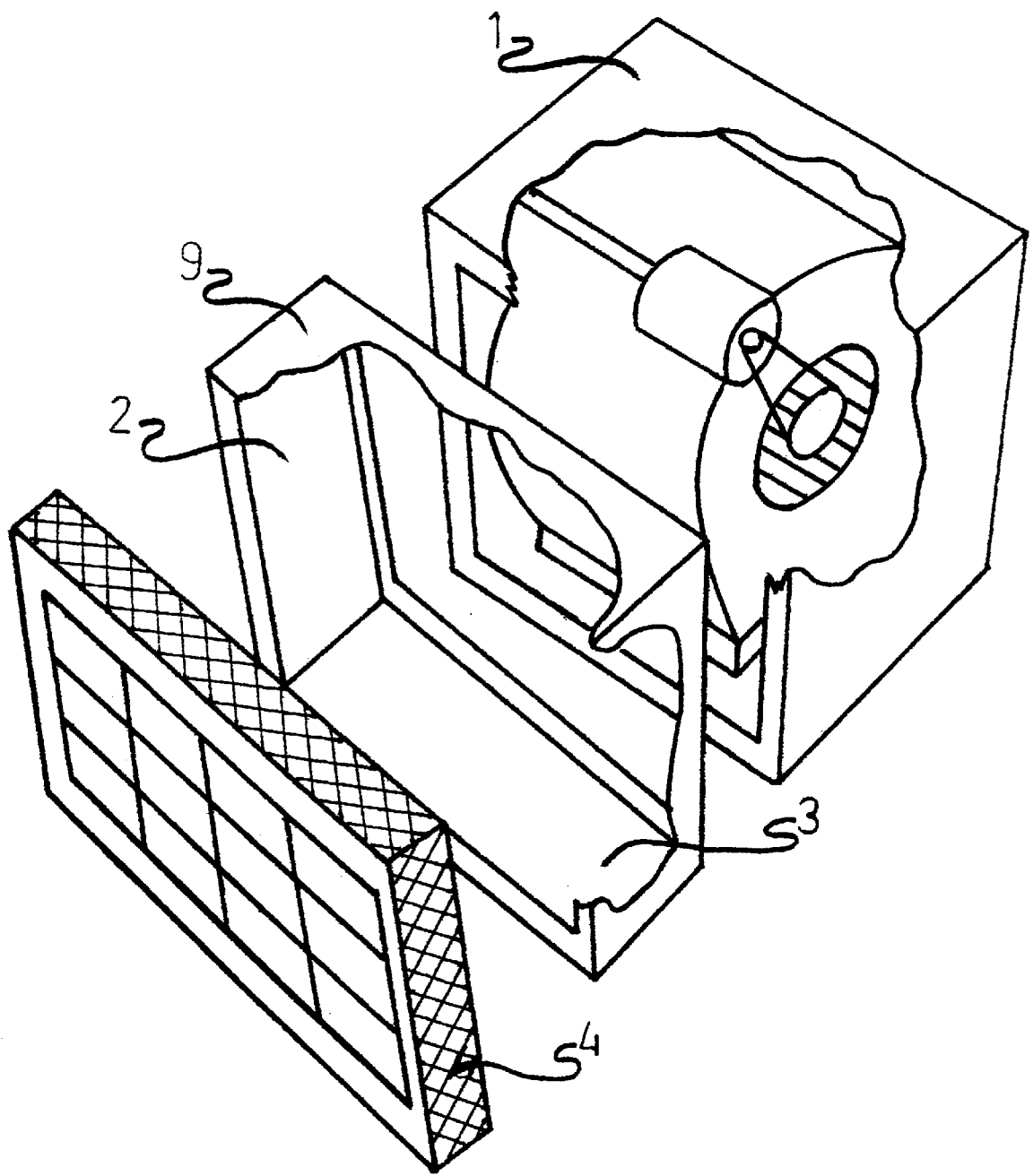
FIG. 1 shows a cut away view of a conventional, single inlet, single pad, side-mounted-wet section evaporative cooler.

1. Cabinet of single inlet evaporative cooler
2. Interior side wall of wet section
3. Water reservoir of wet section
4. Single inlet cooler pad
5. Installation tab
6. Molded spacer
7. Air inlet
8. Styrofoam spacer
9. Wet section
10. The invention

DETAILED DESCRIPTION OF THE INVENTION

FIG. 1 illustrates a cut away view of the most common single inlet evaporative cooler configuration in use today. While different manufacturers have some differences in their individual configurations, all function on the same principal and all consist of a cabinet 1, wet section 9, interior side walls 2, water reservoir 3 and a single inlet pad 4.

Figure 2:
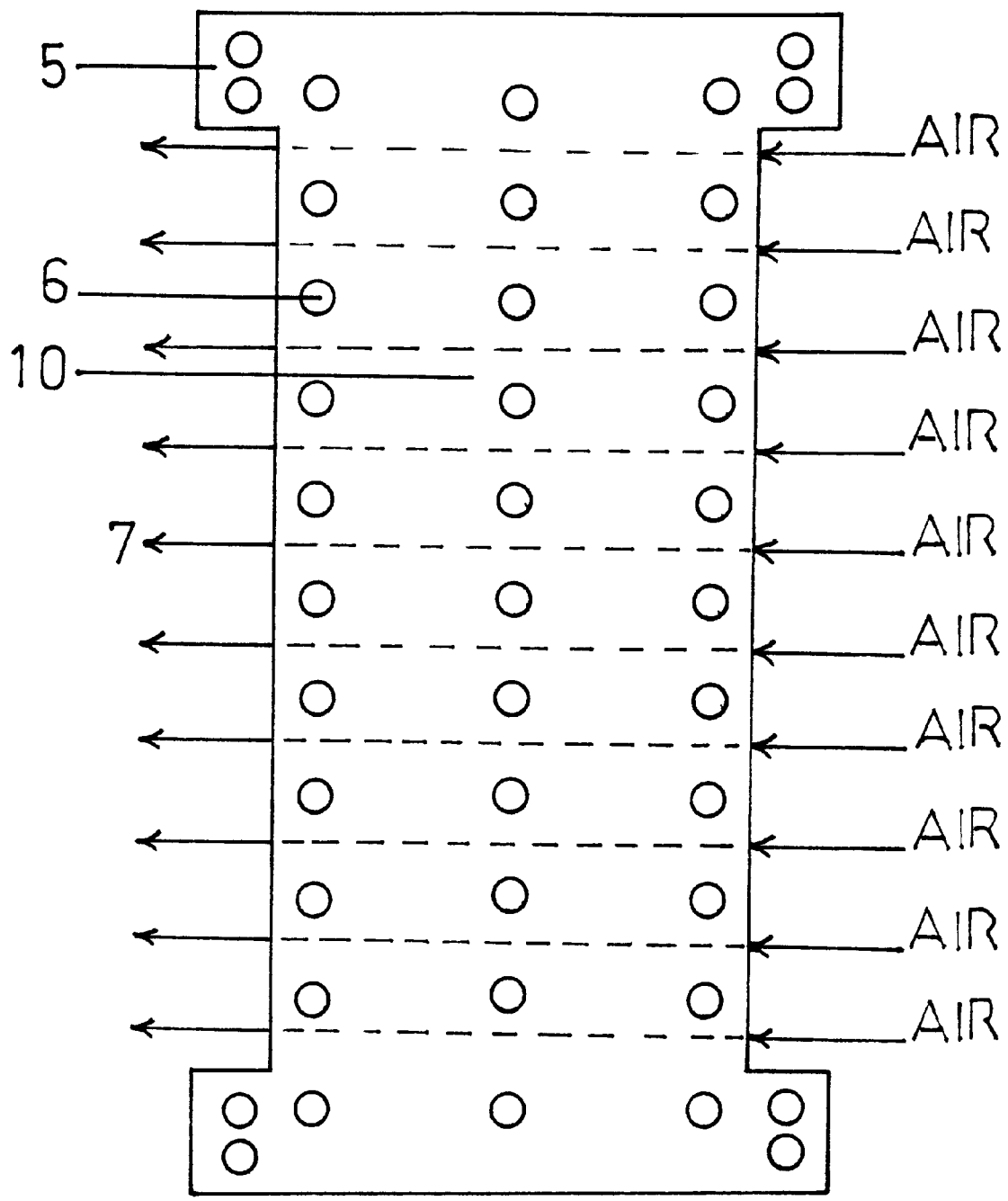
FIG. 2 shows a perspective straight-on view of the pad shield.

FIG. 2 illustrates a typical embodiment of the invention 10. The invention 10 is a flat non-ferrous article on one side with molded in spacers 6 that protrude from the opposite side. It has installation tabs 5 at each of its four corners which allows for exact positioning during installation without requiring attention to detail. The invention can be installed with either end up and on either side wall without attention to orientation.

Figure 3:
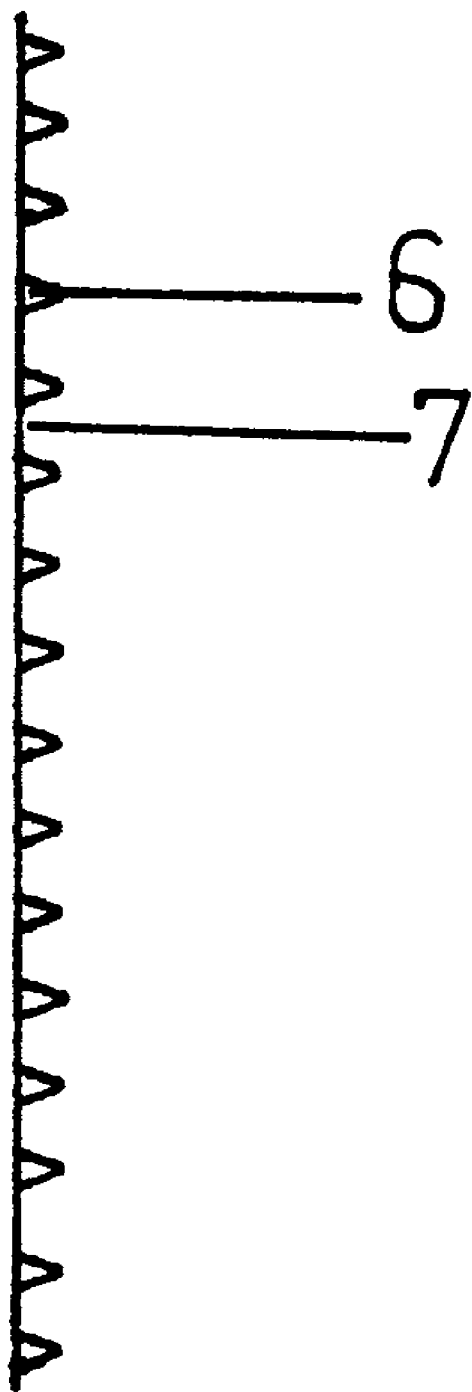
FIG. 3 shows a perspective side view of the pad shield.

FIG. 3 illustrates a perspective side view of the invention. The molded in spacers 6 are sharply cone shaped so that the least possible contact is made with the wet section interior side wall 2. A slight flow of air is pulled, by the air pressure differential between the inside and outside of the cooler cabinet, into the air inlets 7 during operation. When the cooler is turned off, these same air inlets 7 allow for rapid evaporation of any residual moisture from sweating left on the interior side wall 2.

Figure 4:
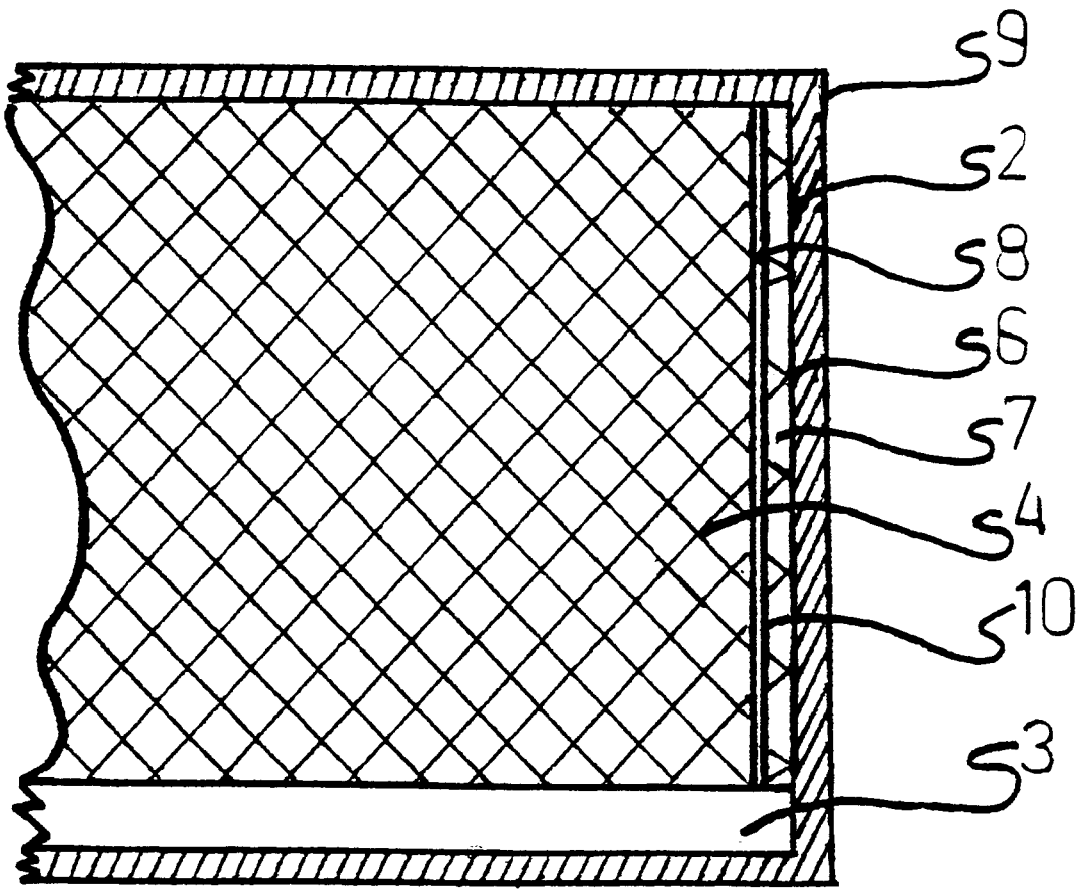
FIG. 4 shows a sectional view of the pad shield as it would stand off from the interior side wall of the cooler's wet section.

FIG. 4 illustrates a sectional view of a typical installation of the invention 10. The invention 10 is placed against the interior side wall 2 of the wet section 9 presenting the protruding cone shaped molded in spacers 6 onto the interior side wall 2 of said wet section 9. The standard Styrofoam spacer 8 is then placed against the flat side of the invention 10. The single inlet pad 4 is then wedged firmly into position in the normal manner. When the cooler is activated, the air pressure differential between the inside of the cooler cabinet and the outside of the cooler cabinet causes a slight flow of dry air to actively be pulled across the wet section interior side wall 2. Not only does the invention 10 shield water from passing onto the interior side wall 2 from the pad 4, it proactively introduces free oxygen molecules into the area behind the shield preventing moisture from being trapped and thus discouraging all forms of corrosion and specifically addressing the problem of anaerobic corrosion.

This description is of the preferred embodiment.

The pad shield would be preferably pressure or vacuum formed from thermoplastic material, e.g., polyvinyl chloride, but could be satisfactorily fashioned by injection molding of styrene or ABS, or formed of polypropylene, polyethylene, polycarbonate, nylon or rubber, or other non-ferrous materials, depending upon the economies of scale and tooling costs. The pad shield would be manufactured in a variety of sizes that would accommodate the majority of single inlet evaporative coolers in use today.

Although the description above contains many specificity's. These should not be construed as limiting the scope of the invention but as merely providing illustrations of some of the presently preferred embodiments of this invention.

Thus the scope of the invention should be determined by the appended claim and its legal equivalents, rather than by the examples given.

I claim:

1. A non-ferrous shield for retarding corrosion within a single inlet evaporative cooler, wherein said cooler includes a wet section having interior side walls surrounding edges of a removable, moisture absorbent pad, said shield being positioned between said interior side walls of said cooler and said edges of said pad, said shield comprising:

a substantially planar, molded structure having a first surface facing said edges of said pad and a second surface facing said interior side walls of said wet section of said cooler, when in operative position; said first surface being generally flat so as to seat against said edges of said removable pad, said second surface including a plurality of integrally molded spacers protruding from an otherwise substantially flat surface, said spacers maintaining an active air space between said interior side walls of said cooler and said otherwise substantially flat surface of said second surface of said shield to promote immediate drainage and/or evaporation of moisture from said interior side walls of said wet section of said evaporative cooler when said cooler is not operating; said shield being sufficiently flexible so as to permit easy installation into said evaporative cooler and being sufficiently rigid so to hold its own molded, planar shaped structure.

* * * * *